United States Patent
Ikeda

(10) Patent No.: US 11,490,998 B2
(45) Date of Patent: Nov. 8, 2022

(54) BRUSH AND HEAD

(71) Applicant: KYOCERA Corporation, Kyoto (JP)

(72) Inventor: Tomoyoshi Ikeda, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 237 days.

(21) Appl. No.: 16/955,575

(22) PCT Filed: Dec. 20, 2019

(86) PCT No.: PCT/JP2019/050121
§ 371 (c)(1),
(2) Date: Jun. 18, 2020

(87) PCT Pub. No.: WO2020/137892
PCT Pub. Date: Jul. 2, 2020

(65) Prior Publication Data
US 2021/0220100 A1    Jul. 22, 2021

(30) Foreign Application Priority Data
Dec. 25, 2018   (JP) .............................. JP2018-240853

(51) Int. Cl.
| A61C 17/22 | (2006.01) |
| A61C 17/34 | (2006.01) |
| A46B 5/00 | (2006.01) |
| A46B 13/02 | (2006.01) |

(52) U.S. Cl.
CPC ........ *A61C 17/222* (2013.01); *A61C 17/3481* (2013.01); *A46B 5/0095* (2013.01); *A46B 13/02* (2013.01); *A46B 2200/1066* (2013.01); *A61C 17/224* (2013.01)

(58) Field of Classification Search
CPC ....... A61C 17/22; A61C 17/34; A61C 17/222; A61C 17/3481
See application file for complete search history.

(56) References Cited

U.S. PATENT DOCUMENTS

| 4,192,035 A * | 3/1980 | Kuris ................. A61C 17/3481 |
| | | 318/116 |
| 5,165,131 A | 11/1992 | Staar |
| 2003/0031979 A1 | 2/2003 | Shortt et al. |
| 2020/0383468 A1 | 12/2020 | Ikeda |

FOREIGN PATENT DOCUMENTS

| CN | 111436190 A | 7/2020 |
| CN | 111491539 A | 8/2020 |
| JP | 2003061986 A | 3/2003 |
| JP | 2018527158 A | 9/2018 |

* cited by examiner

*Primary Examiner* — Shay Karls
(74) *Attorney, Agent, or Firm* — Studebaker & Brackett PC

(57) ABSTRACT

A brush includes a head with bristles, an actuator that expands and contracts in accordance with an electric signal, a connection member that transmits vibration of the actuator to the head, and a body including a housing that houses the actuator. The direction of reciprocal vibration of the head is at a predetermined angle relative to the direction of extension of the housing.

10 Claims, 2 Drawing Sheets

BRUSH AND HEAD

CROSS-REFERENCE TO RELATED APPLICATION

The present application claims priority to and the benefit of Japanese Patent Application No. 2018-240853 filed Dec. 25, 2018, the entire contents of which are incorporated herein by reference.

TECHNICAL FIELD

The present disclosure relates to a brush and a head.

BACKGROUND

Electric toothbrushes are known.

SUMMARY

Such electric toothbrushes, however, are made simply by motorizing a known manual toothbrush.

A brush according to the present disclosure includes a head including bristles, an actuator configured to expand and contract in accordance with an electric signal, a connection member configured to transmit vibration of the actuator to the head, and a body including a housing that houses the actuator. A direction of reciprocal vibration of the head is at a predetermined angle relative to a direction of extension of the housing.

DETAILED DESCRIPTION

A new brush, not merely motorized known brush, is described in embodiments below.

Figure 1:
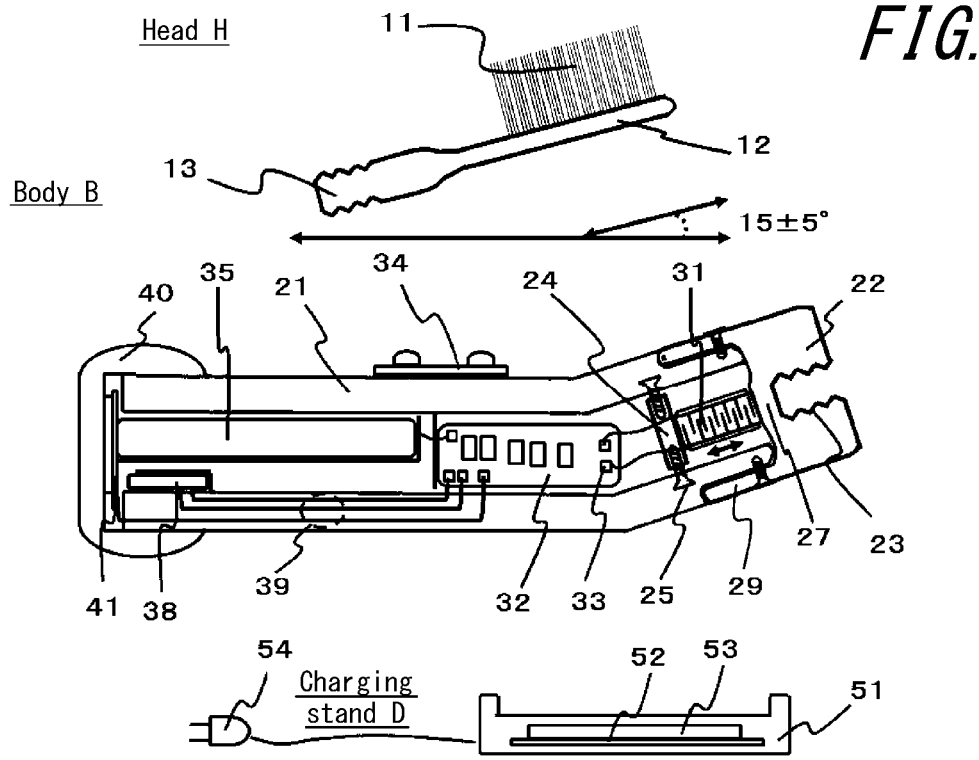
FIG. 1 is a cross-sectional diagram illustrating a first structural example.
Figure 4:
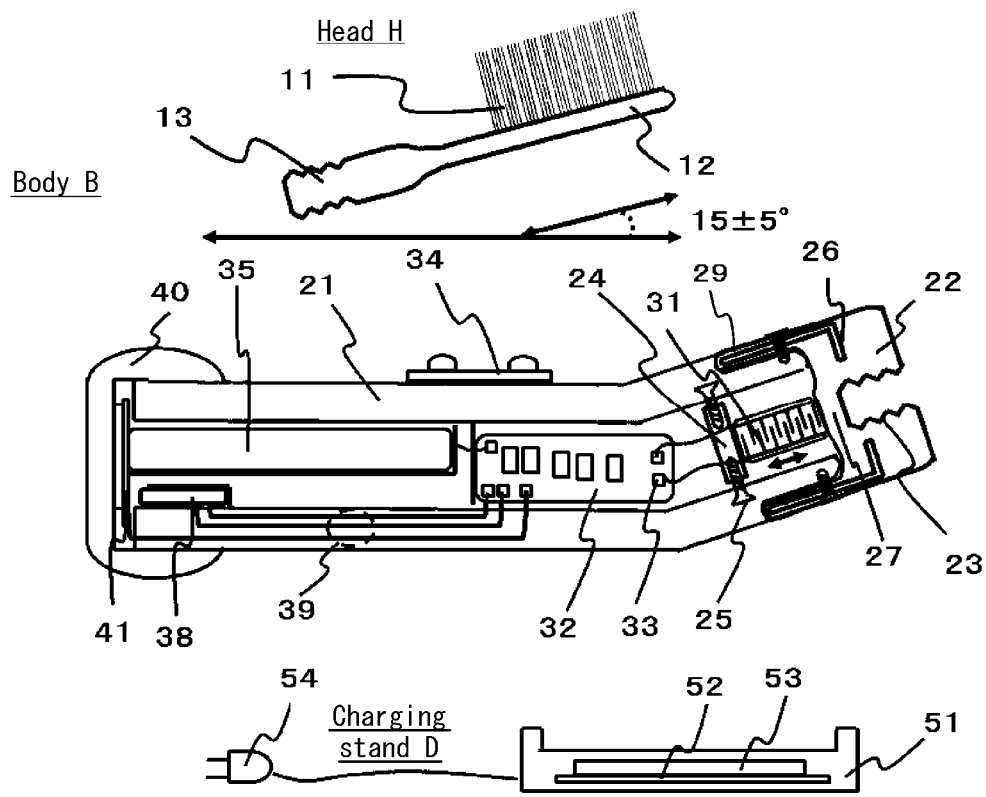
FIG. 4 is a cross-sectional diagram illustrating a second structural example.

FIG. 1 and FIG. 4 are cross-sectional diagrams of a brush according to embodiments. The brush is described as being a toothbrush in these examples but may be a different type of brush.

For example, the toothbrush may be divided largely into three members. The first is a head H that includes bristles 11. The second is a handle portion, i.e. a body B that includes a housing 21. The third is a charging stand D that is unnecessary when a dry cell is used, for example, but is useful when a rechargeable battery is used.

Each member is now described with reference to the structure in FIG. 1. The head H includes bristles 11, a holder 12, and a fixing portion 13.

The bristles 11 are, for example, a collection of nylon strings with a diameter of approximately 0.1 mm to 0.4 mm. In the bristles 11, approximately 15 to 20 of the aforementioned strings with a length of roughly 30 mm to 40 mm are bundled together, folded in half at the middle of the bundle, and inserted into a hole of the holder 12, described below. In other words, after insertion, a bundle of approximately 30 to 40 strings is located inside one hole. The bristles 11 after insertion are cut to equal length. The length to the tip of the bristles 11 protruding from the holder 12 after cutting is, for example, from 0.7 mm to 13 mm. The cut surface may be a flat surface, such that the length of the bristles 11 is uniform, or a surface such that the length of the bristles 11 differs like a jagged sawtooth shape.

The holder 12 may be made of a plastic material such as acrylic, polycarbonate, or polypropylene. Approximately 12 to 36 holes, measuring approximately 1.3 mm to 2.1 mm in diameter, are provided on the surface of the holder 12 for embedding the above-described bristles 11.

The bristles 11 are pressed into these holes. The dimensions of the holder 12 may, for example, be a height of 15 mm to 35 mm and a width of 8 mm to 15 mm on the surface on which the holes are provided (hole-side surface) and a thickness orthogonal to this surface of 2 mm to 10 mm, including the thickness of the actuator 31.

The fixing portion 13 is located at the end on the opposite side of the holder 12 from where the bristles 11 are embedded. The fixing portion 13 fits with and is fixed by a pedestal 24 on the body B side. The fixing portion 13 and the pedestal 24 may be a combination of a male screw and a female screw. The cross-sectional surfaces of the positions fitted together may, for example, have a sawtooth shape to prevent separation after insertion by pressing.

This configuration allows the head H to be replaced while reducing the likelihood of the head H being accidentally separated.

The body B may be configured to include a housing 21 that serves as a handle, an actuator 31, a substrate 32 on which a control system, a step-up circuit, and the like are mounted, electrode pads 33, a cap 40, a battery 35, an operation interface 34, a connection member 22, and the like. The housing 21 is tubular and includes a memory 38, the battery 35, the substrate 32, and the like therein. The connection member 22 is fixed at one end of the housing 21, and the inside of the housing 21 may be sealed by the connection member 22. The cap 40 is fixed at the other end of the housing 21, which may be sealed by the connection member 22.

The housing 21 functions as a support of the head H. The housing 21 also houses the substrate 32, the battery 35, and the like inside the housing 21. The housing 21 is strong enough not to break when grasped by an adult during normal use and may be made from a plastic material such as acrylic, polycarbonate, or polypropylene. The length of the housing 21 is, for example, approximately 10 cm to 25 cm. The outer diameter of the tubular housing 21 is approximately 1 cm to 3 cm.

A leg 29 of the connection member 22 is fixed to the housing 21 by screws 25, and the connection member 22 has the function of sealing the inside of the housing 21. Holes for inserting the screws 25 are provided in the connection member 22 and may be sealed by being covered with resin after insertion of the screws 25. Alternatively, a sealing member such as packing may be placed in between before screwing. Apart from fixing with the screws 25, the housing 21 and the connection member 22 may, for example, be fixed by ultrasonic welding or adhesive.

The connection member 22 includes a fixing portion 23, a transmission portion 27, and the leg 29. The connection member 22 has the function of transmitting the below-described vibration generated by expansion and contraction of the actuator 31 in the lamination direction (the arrow in FIG. 1) to the head H of the toothbrush. A rubber material, such as silicone rubber, may be used in the connection member 22. Hard rubber or a plastic material, metal, or the like may be used for the leg 29, which is where the connection member 22 is fixed by the screws 25, and for the fixing portion 23. A softer material than the fixing portion 23, such as rubber, may be used for the transmission portion 27, which is the portion between the actuator 31 and the fixing portion 23. Two-color molding or one-piece molding may be used to manufacture the connection member 22. The connection member 22 may be produced using the same material for all parts, such as the fixing portion 23 and the transmission portion 27. The hardness may be set to an intermediate value between the hardness required for the fixing portion 23 and the hardness required for the transmission portion 27. This simplifies the manufacturing process of the connection member 22.

The connection member 22 is inclined relative to the extending direction of the housing 21 by approximately 10 to 20 degrees. The actuator 31, such as a piezoelectric element, inside the connection member 22 is therefore also inclined relative to the extending direction of the housing 21 by approximately 10 to 20 degrees. The expansion and contraction direction (vibration direction) of the actuator is therefore also inclined relative to the extending direction of the housing 21 by approximately 10 to 20 degrees. The holder 12 of the head H is therefore also inclined relative to the extending direction of the housing 21 by approximately 10 to 20 degrees. In other words, the head H vibrates in a reciprocating manner at an inclination relative to the extending direction of the housing 21 of approximately 10 to 20 degrees, like the actuator 31.

The fixing portion 13 of the head H is inserted into the fixing portion 23 of the connection member 22. As described above, the manner of insertion at the fixing portions 13, 23 may be either screwing or pressing. The male and female sides may be switched. In other words, the fixing portion 23 of the connection member 22 may be male, and the fixing portion 13 of the head H may be female. The hardness of the rubber may be measured based on JIS K 6253 series 2012 using, for example, a GS-719 series or GS-720 series type A durometer produced by Teclock.

The leg 29 of the connection member is tubular so as to surround the actuator 31. The leg 29 comes into contact with the inside wall of the housing 21 and seals the inside of the housing 21. The leg 29 comes into contact with the inner wall of the housing 21 but not with the actuator 31, so as not to impede vibration of the actuator 31.

Inside the housing 21, the pedestal 24 is fixed to the housing 21 by the screws 25. After the screws 25 are inserted into the holes provided in the housing 21 for inserting the screws 25, resin may be poured into the holes to seal the holes and guarantee watertightness. A sealing member called an O-ring may instead be placed over the holes before screwing. The actuator 31 is sandwiched between the pedestal 24 and the transmission portion 27 of the connection member 22. When the actuator 31 expands and contracts, the expanding force is transmitted to the transmission portion 27 side. In other words, the pedestal 24 side is fixed more strongly than the transmission portion 27, making it easier for the actuator 31 to expand towards the transmission portion 27. The pedestal 24 therefore is sufficiently more rigid and strong than the transmission portion 27 of the connection member 22. The pedestal 24 may, for example, be made of a metal material such as SUS or brass. Hard plastic may also be used. The transmission portion 27 deforms due to expansion and contraction of the actuator 31. Accordingly, the fixing portion 23 can cause the bristles 11 to vibrate in substantially the same direction as the expansion and contraction direction of the actuator 31. "Substantially the same direction" refers to an angle of 10 degrees or less between the vibration direction of the bristles 11 (the main direction of back and forth movement of the bristles) and the expansion and contraction direction of the piezoelectric element. In other words, the bristles 11 vibrate in a reciprocating manner in a range of 90 degrees±10 degrees relative to the extending direction of the bristles.

The actuator 31 in the present embodiment is, for example, a laminated piezoelectric element. A laminated piezoelectric element is formed by alternate layers of a dielectric, such as PZT, exhibiting voltage characteristics and internal electrodes with a comb-shaped cross-section. The internal electrodes are formed by alternate layers of a portion connected to an electrode on a first side surface and a portion connected to an electrode on a second side surface.

The piezoelectric element has at least two electrodes. The piezoelectric element is electrically connected to the electrode on one side and the electrode on the other side through wires 39 from the substrate 32. The laminated piezoelectric element has a length of, for example, 5 mm to 120 mm in the lamination direction (which substantially matches the aforementioned vibration direction of the piezoelectric element). The cross-sectional shape of the laminated piezoelectric element in a direction orthogonal to the lamination direction may be any shape, including a substantially square shape between 2 mm square and 15 mm square, or a shape other than a square such as a cylindrical shape. The number of layers and the cross-sectional area of the laminated piezoelectric element are determined as appropriate.

A signal (supply signal) from the substrate 32, for example, is supplied to the laminated piezoelectric element. In other words, when the voltage applied to the laminated piezoelectric element from the substrate 32 is alternating current (AC) voltage, a positive voltage may be applied to the electrode on one side and a negative voltage may be applied to the electrode on the other side at a certain moment. Conversely, when negative voltage is applied to the electrode on one side, positive voltage is applied to the electrode on the other side. Upon voltage being applied to the electrode on one side and the electrode on the other side, polarization occurs in the dielectric, and the laminated piezoelectric element expands and contracts from the state in which no voltage is applied. The laminated piezoelectric element expands and contracts in a direction substantially along the lamination direction of the dielectric and the internal electrodes. Alternatively, the laminated piezoelectric element may expand and contract in a direction substantially matching the lamination direction of the dielectric and the internal electrodes. Having the laminated piezoelectric element expand and contract substantially along the lamination direction yields the advantage of good vibration transmission efficiency in the expansion and contraction direction.

Alternatively, when a positive voltage, such as 10 V, is applied from the substrate 32 to the electrode on one side, a voltage of 0 V may be applied to the electrode on the other side in the laminated piezoelectric element. The voltage of the signal (supply signal) applied to the stacked piezoelectric element by a step-up circuit of a drive amplifier 37 may, for example, be from 3 Vp-p to 50 Vp-p but is not limited to this range. The signal supplied to the actuator 31 through the wires 39 and the like has frequency characteristics such as those in FIG. 3, for example.

Figure 2:
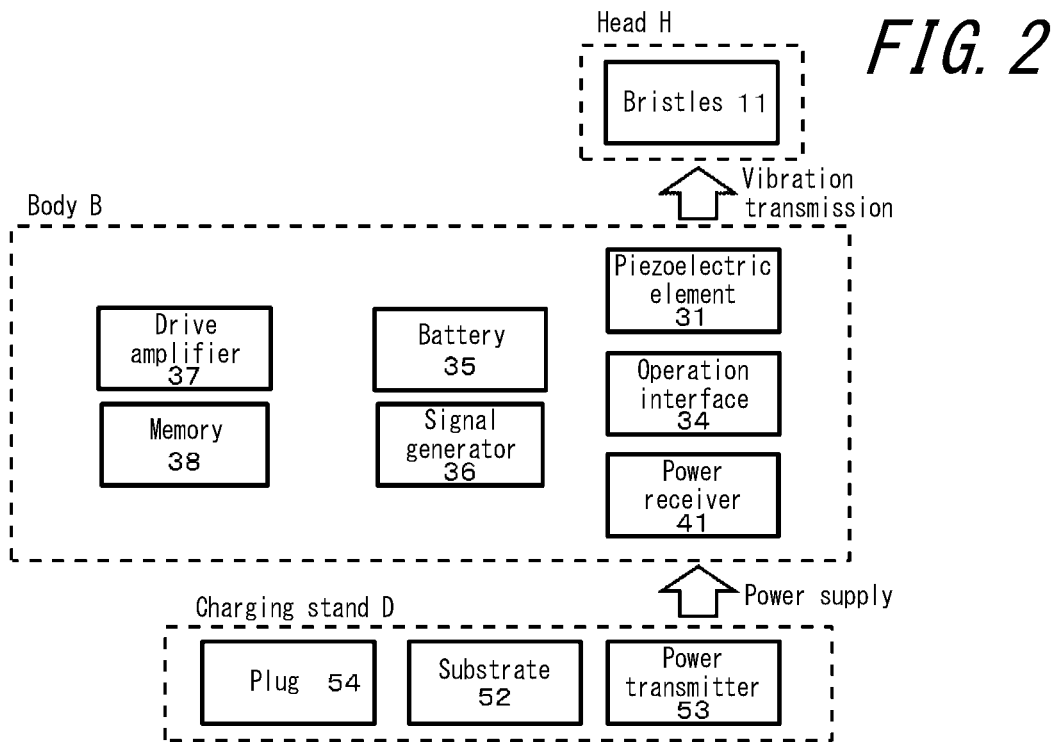
FIG. 2 is a block diagram of an example.

The substrate 32 is housed inside the tubular housing 21 that has a waterproof structure. The functional units represented by the block diagram of FIG. 2 are mounted on the substrate 32. For example, a signal generator 36, the drive amplifier 37, and the like are mounted on the substrate 32.

The operation interface 34 may include a power switch (such as a button switch) for turning the brush on/off, a switch for adjusting the volume (such as a plus button and a minus button), and a switch for selecting content, such as a song or speech. These switches are disposed on the outer surface of the housing 21. The user can operate each switch from outside the housing 21. For example, a waterproof sheet may be adhered to the outer surface of the housing 21, and the switches may be provided on the inside of the sheet.

The battery 35 is housed inside the housing 21. The battery 35 is supplied power, via a power receiver 41, by a wireless power supply from a power transmitter 53 of the charging stand D. The wireless power supply conforms to standards or the like for non-contact power supply. The battery 35 may instead be a dry cell, in which case the power transmitter 53 and the power receiver 41 may be omitted.

The cap 40 is attached to the opposite end of the housing 21 from the connection member 22. The cap 40 seals the inner space where the battery 35 and substrate 32 are disposed. A substrate that includes the power receiver 41 and a terminal and circuit for transmitting the received power to the battery 35 is provided on the inner surface of the cap 40.

A memory slot for storing the memory 38 is provided inside the housing 21. The memory 38 may be a type of memory referred to as an SD card, for example, or may be an independent flash memory. The cap 40 may be removable by the user for purposes such as removing/inserting the memory 38 or replacing the battery 35. Various sound sources may be stored in the memory 38. For example, content such as a song or sound source that the user likes can be stored on the memory 38 via a PC or smartphone as an audio signal, and the memory with the song can be inserted into the memory slot inside the housing 21.

The charging stand D includes a housing 51, a substrate 52, the power transmitter 53, and a plug 54. The housing 51 of the charging stand D includes a main surface on a flat plate onto which the body B can be mounted. The power transmitter 53 is disposed on the main surface, and power is transmitted to the power receiver 41 of the body B. The substrate 52 is disposed on the inside of the housing 51 and converts power supplied from a commercial power source via the plug 54 to transmittable power conforming to a non-contact power supply.

Next, the example in FIG. 2 is described, including the electrical connection relationship such as the circuit configuration.

The charging stand D includes the plug 54 for connection to a 100 V, 1.5 A, 50/60 Hz commercial power supply, for example. The power supplied from the plug 54 is transmitted through a circuit mounted on the substrate 52, converted to a voltage and current conforming to a non-contact charging standard, and transmitted to the power transmitter 53.

The power from the power transmitter 53 is accumulated in the battery 35 via the power receiver 41.

The body B is configured to include the piezoelectric element 31, the operation interface 34, the battery 35, the signal generator 36, the drive amplifier 37, the memory 38, the power receiver 41, and the like.

The operation interface 34 may include a switch circuit for turning the brush on/off and a volume adjustment circuit. The operation interface 34 may further include a switch circuit for song selection.

The battery 35 may include a charging circuit and an overcharge prevention circuit. The battery 35 may also include a thermistor.

The memory 38 stores an audio signal and the like for driving the piezoelectric element 31. Specifically, an audio signal formed from a predetermined frequency band in the audible range is stored. This audio signal includes a non-discrete signal, i.e. a signal with a continuous spread, at frequencies in the audible range of 20 kHz or less. The non-discrete signal is measured by procedures (1) to (4) below and satisfies condition (5).

(1) A speaker capable of outputting air-conducted sound at least from 200 Hz to 10000 Hz is placed at a position approximately 5 cm from an artificial ear of an IEC60318 series HATS.

(2) Audio is continuously played back by the speaker for 10 seconds or more using the aforementioned audio signal.

(3) A fast Fourier transform (FFT) is performed on the sound pressure inputted from the microphone of the HATS.

(4) In a graph representing the frequency characteristics of the output value after the FFT, the output value is expressed as frequency F (Hz)=1×n: (where n is an integer from 200 to 10000).

Figure 3:
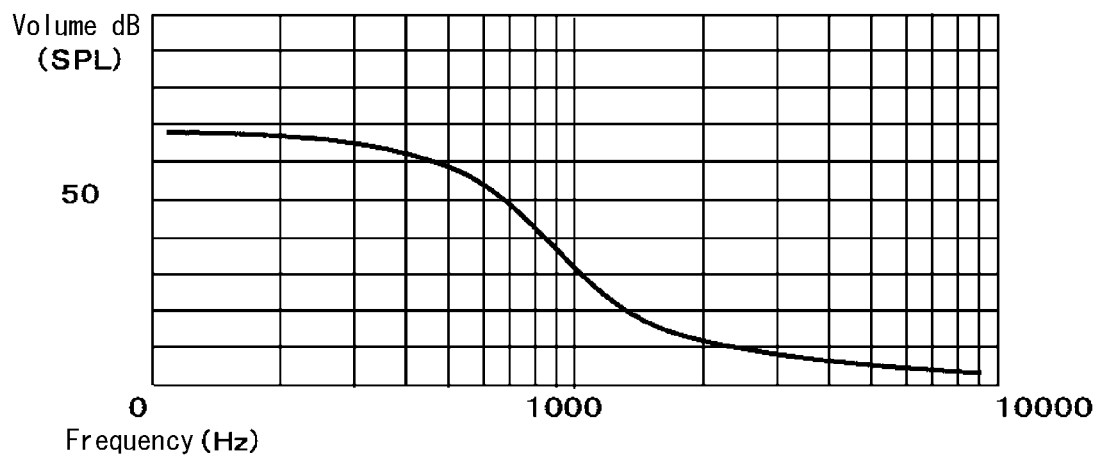
FIG. 3 illustrates the frequency characteristics of a signal in an example.

(5) The condition is the existence of 50 or more continuous integers n at which the significant output value exceeds floor noise by 15 dB (SPL) or more. For example, a significant detection value is outputted at all of n=250, 251, 252, ..., 299, 300. FIG. 3 illustrates an example of this case.

This non-discrete signal is, for example, an analog or digital audio signal. A music signal, data of a conversation between people, a singing voice, or the like may be included in the audio signal. However, a signal presenting only a single frequency, referred to as a pure tone in the field of acoustics, is not included in the non-discrete signal as used here, nor is a signal for driving a motor or the like at a single speed.

A signal composed only of a plurality of pure tones is also a discrete signal and therefore is not included. For example, a signal composed of only a 200 Hz pure tone and a 10 kHz pure tone is not included among non-discrete signals, because n in the aforementioned equation only has two values (n=200, n=10000), and the integers n are not continuous.

An ultrasonic signal corresponding to frequencies from over 20 kHz to 100 kHz may further be included in the signals stored in the memory. The ultrasonic signal may be a discrete signal. For example, ultrasonic driving by a signal that is only 50 kHz may be used to increase the brushing effect. In this case, an ultrasonic, pure tone signal may be superimposed on the non-discrete signals in the audible range.

The signals stored in the memory may be encoded and compressed. The memory 38 for storing the signals may be a non-volatile memory.

The signal generator 36 converts the signals stored in the memory 38 to a supply signal to be supplied to the actuator 31 (the signal supplied to the actuator 31 is referred to here as a supply signal). Conversion is unnecessary in some cases. After a predetermined frequency band is intensified or the like, the supply signal is supplied through the drive amplifier 37 to the actuator 31.

The supply signal also includes a signal continuous in a predetermined range of frequency characteristics, i.e. a signal that is non-discrete in a predetermined range, like the non-discrete signals among the signals recorded in the memory. As compared to an original audio signal stored in the memory 38, for example, an intensified signal in which only the frequency characteristics from 200 Hz to 400 Hz are intensified by approximately 20 dB may be generated in the signal generator 36 and designated as the supply signal.

Improvement in the brushing effect can be expected by locally increasing the power of the signal in the low frequency band in this way. This intensified signal may be achieved by correction in an equalizer (a signal generation process) to intensify the desired frequency band when the signal of a song outputted from the memory 38 is fed to the drive amplifier 37. An actual signal having frequency characteristics similar to those of the intensified signal may also be stored in the memory 38 as an audio signal from the start.

Next, the operations of the actuator 31 and the bristles 11 are described. The actuator 31 generates vibration by expanding and contracting in the lamination direction (the arrow in FIG. 1) in accordance with the supply signal received via the drive amplifier. The bristles 11 of the head H vibrate back and forth (the arrow in FIG. 1) by the transmission portion 27 vibrating back and forth along the expansion and contraction of the actuator 31. A song is played back by this vibration being repeated in accordance with the supply signal. The toothbrush that vibrates back and forth together with the song transmits vibration to the teeth of the user through the bristles 11. Consequently, the user can hear sound through the teeth by bone conduction.

A switch of the operation interface 34 may be operated to switch between a regular mode for driving based on a basic audio signal and an intensified mode for intensifying brushing. The volume may also be adjusted with a switch of the operation interface in either the normal mode or the intensified mode. When a volume adjustment operation to increase the volume is performed, the magnitude of power supplied to the actuator 31 is changed so that the overall volume of the song increases, regardless of particular frequencies.

Vibration in various frequency bands can also be obtained by changing the type of basic signal, i.e. changing the song, story, or other such content. The user may therefore be able to brush his teeth at a vibration matching the content that he likes while listening to the content by bone conduction through the teeth.

In addition to the audible range (10 Hz to 20 kHz), the actuator 31 may also vibrate in the ultrasonic band (20 kHz or more). For example, in addition to continuous vibration in the audible range (10 Hz to 20 kHz), the actuator 31 may also vibrate only near 50 kHz. This enables brushing by ultrasonic vibration. The signal for ultrasonic vibration may be a pure tone or a discrete signal. The signal may also be a continuous, non-discrete signal.

Next, a second structural example is described with reference to FIG. 4, focusing in particular on the differences from FIG. 1. The main difference from the first structural example of FIG. 1 is the provision of reinforcing members 26 formed by insertion molding inside the leg 29 of the connection member 22. The reinforcing members 26 are formed by bending SUS or sheet metal, for example, into an L shape. When the connection member 22 is fixed to the housing 21, both the housing 21 and the reinforcing members 26 are fixed by the screws 25.

The connection member 22 is thereby easy to fix to the housing 21 even when a soft material, such as a Shore 00 hardness of approximately 30 to 70, matching the hardness of the transmission portion 27 is used for the connection member 22. The Shore 00 hardness, which is the hardness of rubber, can be measured by a durometer conforming to the ASTM D 2240 standard, such as GS-754G produced by Teclock. The reinforcing member 26 need not be provided in a region opposite the transmission portion 27 in the vibration direction of the piezoelectric element 31. In this case, the reinforcing member 26 may have an annular part that encircles the transmission portion 27 and the fixing portion 23 while avoiding these portions. Alternatively, a structure that tends not to impede the vibration transmission of the vibration portion 27 may be adopted, such as a rod-shaped metal fitting that is simply bent into an L shape. The reinforcing member 26 is not limited to being metal and may instead be hard plastic. In the connection member 22, hard plastic may be embedded integrally into a soft rubber material or the like by two-color molding.

Although embodiments of the present disclosure have been described with reference to the drawings and examples, it is to be noted that various changes and modifications will be apparent to those skilled in the art based on the present disclosure. Therefore, such changes and modifications are to be understood as included within the scope of the present disclosure. For example, the functions included in the various components may be reordered in any logically consistent way. Furthermore, components may be combined into one or divided.

The invention claimed is:

1. A brush comprising:
 a head comprising bristles;
 an actuator configured to expand and contract in accordance with an electric signal;
 a connection member configured to transmit vibration of the actuator to the head; and
 a body comprising a housing that houses the actuator;
 wherein the housing further houses a pedestal in an inclined angle with respect to an extending direction of the housing, the pedestal being fixed to the actuator which vibrates in the inclined direction, and wherein the bristles of the head vibrate in a reciprocal manner in the inclined direction.

2. The brush of claim 1, wherein a signal for driving the actuator comprises a signal generated from a non-discrete signal.

3. The brush of claim 2, wherein the non-discrete signal comprises an audio signal.

4. The brush of claim 3, wherein when the actuator is being driven based on the audio signal, a bone-conducted sound is generated upon the bristles coming into contact with a tooth of a user.

5. The brush of claim 1, wherein the connection member comprises a transmission portion configured to deform in accordance with expansion and contraction of the actuator.

6. The brush of claim 5, wherein the transmission portion of the connection member faces the actuator.

7. The brush of claim 6,
 wherein the pedestal and the transmission portion press the piezoelectric element.

8. The brush of claim 1, wherein the head comprising the bristles is removable from the body.

9. The brush of claim 1, wherein the inclined angle is 10 degrees or more and 20 degrees or less.

10. A head replaceable with respect to the body of claim 1.

* * * * *